Aug. 14, 1923.

N. TRBOJEVICH

GEAR

Filed Jan. 3, 1922    2 Sheets-Sheet 1

Inventor
Nikola Trbojevich

By Whittemore Hulbert Whittemore
& Belknap    Attorneys

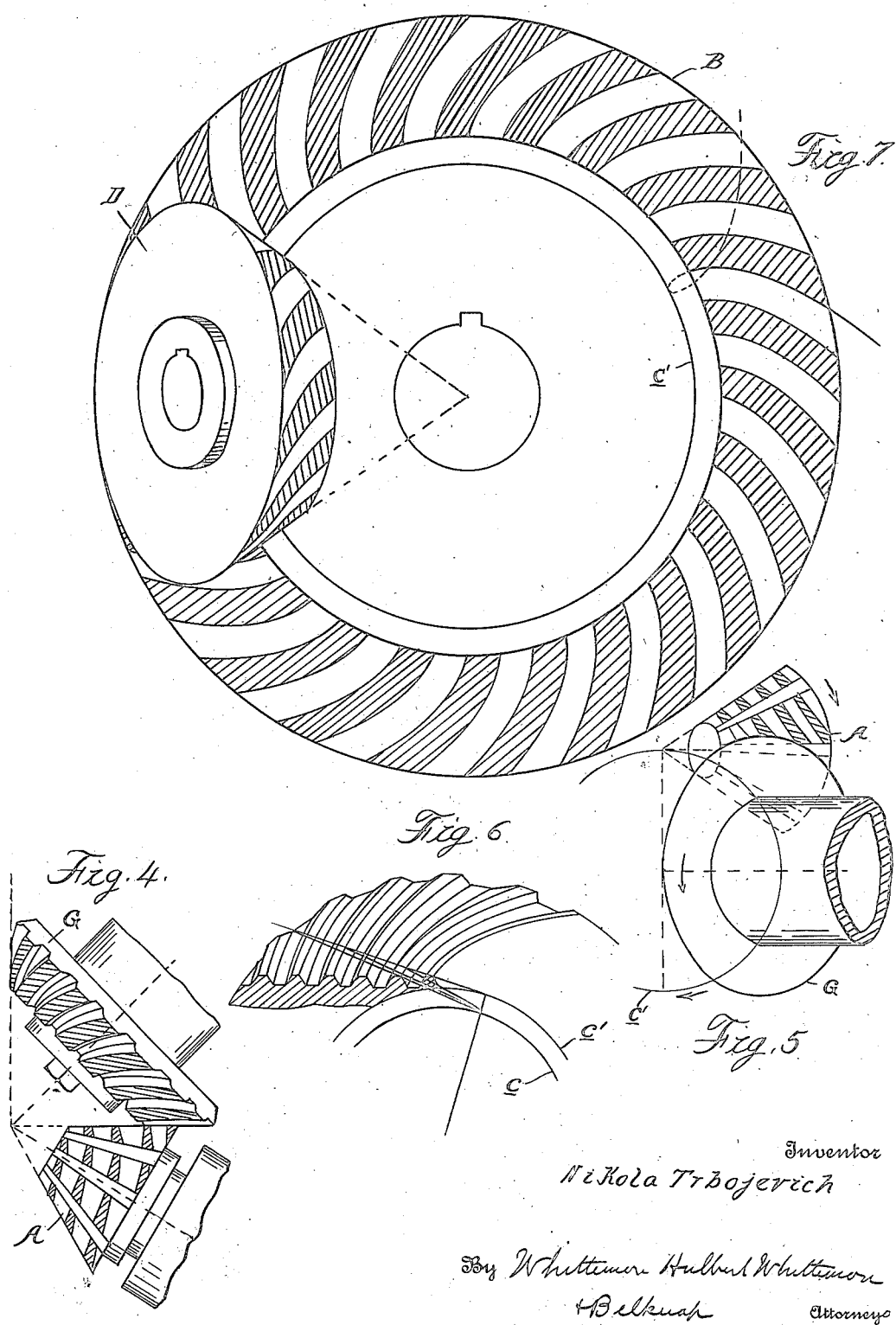

Patented Aug. 14, 1923.

1,465,149

UNITED STATES PATENT OFFICE.

NIKOLA TRBOJEVICH, OF DETROIT, MICHIGAN.

GEAR.

REISSUED

Application filed January 3, 1922. Serial No. 526,510.

*To all whom it may concern:*

Be it known that I, NIKOLA TRBOJEVICH, a subject of the King of Yugoslavia, residing at Detroit, in the county of Wayne and State of Michigan, have invented certain new and useful Improvements in Gears, of which the following is a specification, reference being had therein to the accompanying drawings.

The invention relates to spiral bevel gears and has for its object the obtaining of a construction which can be successfully manufactured by a hobbing process. The process employed in hobbing, as well as the construction of the hob which is used, are also inventions of mine, but the present application refers solely to the product or gear.

In the drawings:

Figure 4 shows a side elevation of the gear and hob illustrating the method of generation;

Figure 5 is a plan view of the same;

Figure 6 shows a portion of a gear of the extended type in sectional perspective;

Figure 7 is a sectional plan view of a crown gear and pinion of the abridged type;

The novel characteristic of my improved gear is the form of the tooth in longitudinal contour, which is such that the successive teeth are non-parallel and of changing cross-section but which nevertheless can be generated from a rack of constant pitch. The curve of the tooth longitudinally is what may be termed a "modified" involute of a circle and it may be of either two types, respectively designated as "extended" involutes and "abridged" involutes. These will be best understood by reference to the method for generating the same.

Figure 1:
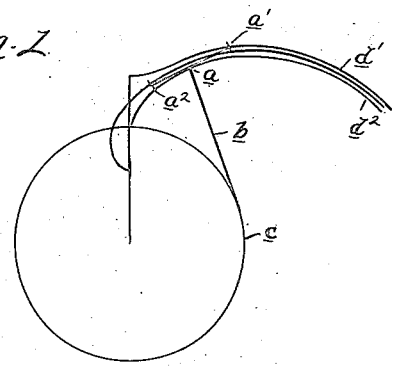
Figures 1 to 3 are the diagrammatic views illustrating the geometrical principles involved.

As shown in Fig. 1, $a$ is a point on a line $b$ which is rolled without sliding about a circle $c$ and which traces a line $d$ that is a true involute of a circle. If the point $a$ is offset from the line $b$, either outwardly or inwardly, as indicated at $a'$ and $a^2$, such offset points, if maintained in rigid relation to the line $b$, will trace modified involute curves $d'$ and $d^2$. These are non-parallel with the curve $d$, but constantly approach the latter and will merge with the same at an infinite distance.

Figure 2:
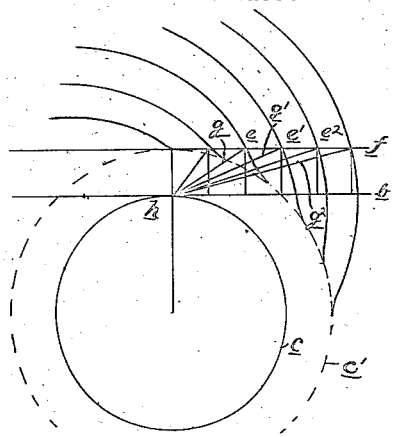

Figure 2 shows a series of extended involute curves which are generated by equispaced points $e$, $e'$ etc. on the line $f$ parallel to and outwardly spaced from the line $b$. Such curves are non-parallel and outwardly divergent and the normals $g$, $g'$ etc. drawn from each curve at the point of intersection with the line $f$ will all intersect in the point $h$, which is the point of tangency of the line $b$ with the base circle $c$.

Figure 3:
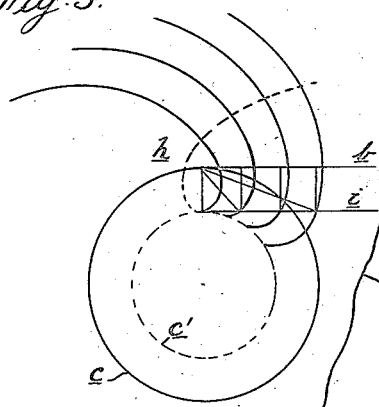

Figure 3 shows a series of abridged involute curves which are generated by equispaced points upon the line $i$ inwardly offset from the line $b$. These curves are also non-parallel and outwardly divergent and moreover the normals drawn from the respective curves at the points of intersection with the line $i$ will all pass through the point $h$, which is the point of tangency of the line $b$.

If the line $f$, Figure 2, is regarded as a rack of constant pitch and infinitesimal thickness, this in the movement previously described will generate spiral teeth of a crown gear, and by reason of the fact that the rack is constantly changing its angular relation to the curves, the teeth generated and also the interdental spaces will be non-parallel, of progressively increasing width and of modified involute curvature.

The peculiar characteristics of these curves is that any series traced by equispaced points on the offset line may be arranged tangent to any other series of curves traced by equally spaced points on a line equally offset whether the base circles for the two series are the same or different, or whether the offsetting of the line is inward or outward from the base circle, the one generating abridged modified involute curves and the other extended modified involute curves. Where the inward offsetting of the line is equal to the radius of the base circle, the curves generated become Archimedean spirals and may in development form a helix of constant lead on the surface of the cone. Therefore, by constructing a conical hob, which in axial section forms a rack of constant pitch, such a hob is capable of generating in the gear blank nonparallel curves of the character described and without interference or mutilation.

The method of generating my improved gears forms the subject-matter of another application for patent, but, in brief, it consists; first, in forming a tapering or conical hob A, Figure 4, which in longitudinal section is a rack of constant pitch corresponding to the pitch desired in the gears to be generated; second, in setting the hob in relation to the gear blank G so that the pitch cones thereof are tangent to a common plane and the axis of the hob is offset from the imaginary base circle of the gear to be generated equal to the radius of its own base circle; third, in relatively rotating the hob and the gear blank so that each revolution of the hob will advance one tooth of the gear if the hob is of single thread or a plurality of teeth if of multiple thread; fourth, in imparting a movement of translation of the hob about a segment of the base circle of the gear blank, such movement being sufficient to pass completely across the face of the blank, as indicated in Fig. 5.

Figure 6 illustrates a portion of a gear of my improved construction in which the teeth are shown to be generated by a rack of constant pitch and to have a longitudinal curvature of an extended involute. Figure 7 is a plan view showing a crown gear B in mesh with a pinion D both of abridged modified involute curvature. Either form of gear will perfectly mesh with a similar gear of the opposite hand (right or left), which is generated by an equal hob of the opposite hand. Also, all gears which are generated by the same hob and which have the same base circle will mesh with all gears generated by an equal hob of the opposite hand and which have the same base circle.

Figure 8:
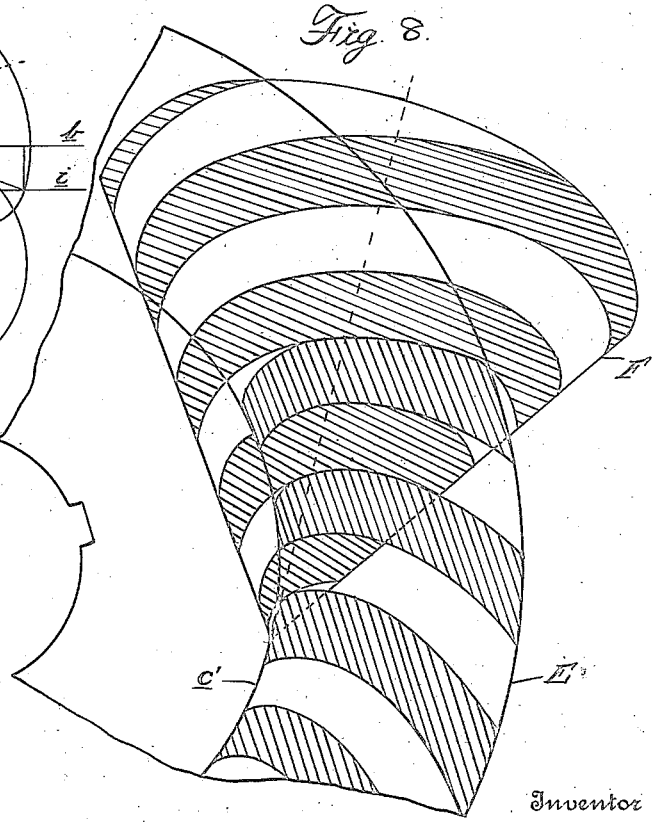
Figure 8 is a similar view of the improved gear meshing with a taper worm.

As diagrammatically illustrated in Fig. 8, my improved gear E can be superposed over a tapering worm F and will mesh with same correctly and without interference, and any one of the series generated by the same hob and having the same base circle will mesh equally well with such a tapering worm if the latter corresponds in form to the generating hob. This feature is of importance for, as far as I am aware, no spiral bevel gears, as heretofore constructed, have been capable of running in mesh with a worm.

What I claim as my invention is:

1. A bevel gear of a form such as might be generated by rolling a conical blank upon a crown gear, the latter having a series of teeth which are longitudinally of modified involute curvature and are non-parallel.

2. A bevel gear of a form such as might be generated by rolling a conical blank upon a crown gear, the latter having a series of teeth which are longitudinally of modified involute curvature and are non-parallel, said curves in the pitch plane being generated by equi-spaced points on a line parallel to and in rigid relation to a line rolling, without sliding, upon a base circle.

3. A bevel gear of a form such as might be generated by rolling a conical blank on a crown gear, the latter having teeth which are substantially such as generated by the movement of a rack of constant pitch in fixed parallel spaced relation to a line rolling upon a base circle concentric with the axis of the crown gear.

4. A bevel gear wheel of a form which might be generated by rolling a conical blank upon a crown gear, having teeth longitudinally of modified involute outwardly divergent curvature, all of said curves being substantially such as may be traced by points on a line in fixed spaced parallel relation to a line rolling, without sliding, upon a base circle concentric with the axis of the crown gear.

5. A system of mating spiral bevel gears arranged with their axes non-intersecting and non-parallel the teeth of which in their longitudinal contour are spirals of the general involute type having different base radii but the same absolute value of modification with respect to a common involute of a circle.

6. A system of mating spiral bevel gears having their axes non-intersecting and non-parallel, the teeth of which may be generated by the movement of a rack of constant pitch rolling on the pitch cones of conical blanks along a series of geodesic lines.

7. A system of mating spiral gears, one of which is beveled, said gears having axes which are non-intersecting and non-parallel and the longitudinal curvature of the teeth of which are in development respectively Archimedean spirals and modified involute curves.

8. A system of mating spiral gears having their axes non-intersecting and non-parallel, one of said gears being a conical screw which may be developed by a rack of constant pitch, while the other is a conjugate wheel generated by said conical screw when both are brought into a mutual tangential position and rotated in reverse ratio to their respective numbers of threads or teeth.

In testimony whereof I affix my signature.

NIKOLA TRBOJEVICH.